June 5, 1934.     A. McMILLAN     1,961,504
BREAD KNIFE GRINDING MACHINE
Filed Dec. 2, 1932     2 Sheets-Sheet 1
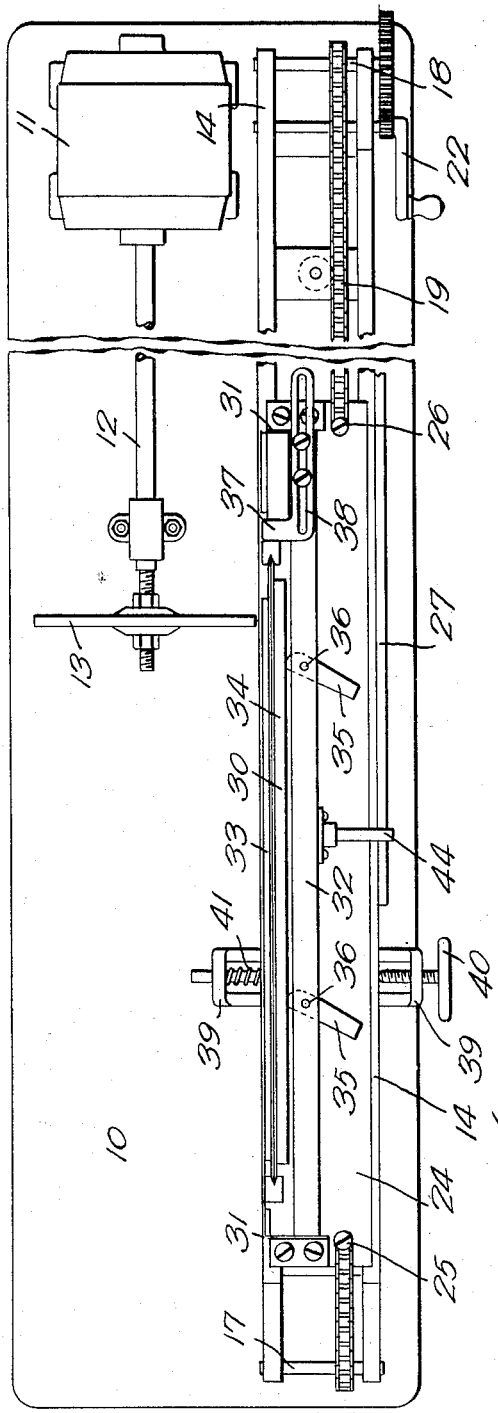
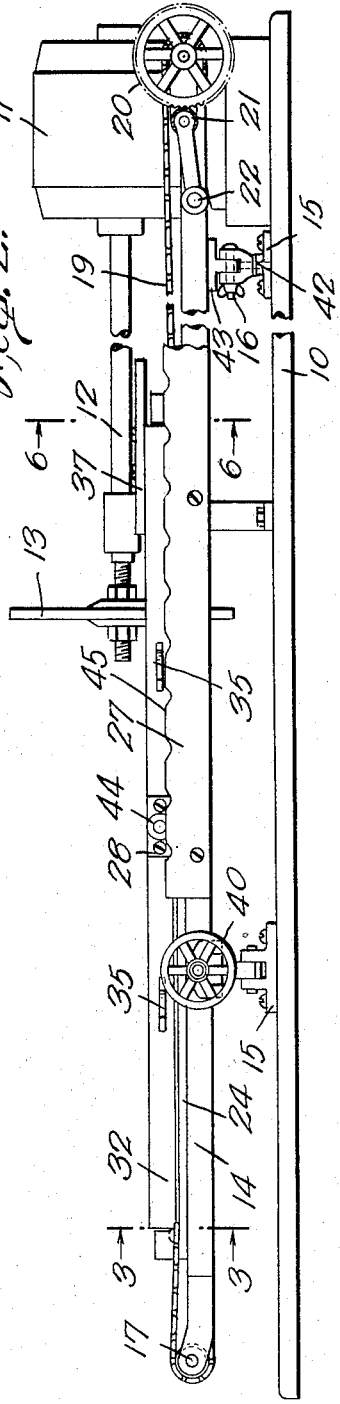
INVENTOR.
Angus McMillan
BY
Harry C. Schroeder
ATTORNEYS.

June 5, 1934. A. McMILLAN 1,961,504
BREAD KNIFE GRINDING MACHINE
Filed Dec. 2, 1932  2 Sheets-Sheet 2

INVENTOR.
Angus McMillan
BY
Harry Schwed
ATTORNEYS.

Patented June 5, 1934

1,961,504

UNITED STATES PATENT OFFICE 1,961,504

BREAD KNIFE GRINDING MACHINE

Angus McMillan, Oakland, Calif.

Application December 2, 1932, Serial No. 645,399

12 Claims. (Cl. 51—100)

This invention is a knife sharpening machine which is specially directed to means for automatically sharpening the serrated and undulating edges of bread knives such as are used in bread slicing machines, although the machine may be used for grinding a sharp edge of undulating form on any type of flat device.

According to present methods, knives having an undulating cutting edge are ground by hand and it is almost impossible to obtain uniformity in the undulations, and which is extremely desirable, especially where the knife is to be used in the usual bread slicing machine.

The main object of the invention is to provide a machine for automatically grinding an undulating cutting edge with a series of uniform undulations.

Another object of the invention is to provide a machine as outlined, in which suitable means is provided for grinding undulations of various forms and pitches.

A still further object of the invention is to provide means to compensate for wear in the grinding wheel and also to compensate for the cutting back of the cutting edge, as the knife is repeatedly ground.

Other objects and advantages of the invention will become apparent as the following description is read on the drawings forming a part of this specification, and in which similar reference characters are used to indicate similar parts throughout the several views, of which:—

Fig. 1 is a plan view of the invention;

Fig. 2 is a side elevation of the invention;

Figure 3:
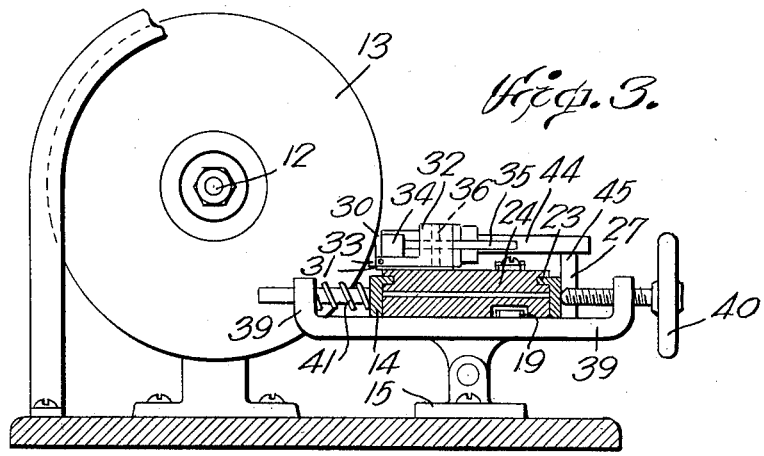
Fig. 3 is a section taken on line 3—3 of Fig. 2.

The invention consists of a base 10, on which is mounted an electric motor 11, having a shaft 12 and a grinding wheel 13 secured on the end of the shaft.

Mounted on the base, parallel to the axis of the grinding wheel 13 is a knife feeding device consisting of a guide 14, this guide being pivotally mounted on brackets 15 as indicated at 16, suitable securing means such as thumb nuts being provided to secure the guide in angularly adjusted position.

Rotatably mounted on shafts 17 and 18 at the respective ends of the guide are sprockets over which a chain 19 operates, th's chain passing through apertures formed through the upper portion of the brackets 15, through which the chain freely passes.

The chain 19 is driven by means of a gear 20 meshing with a pinion 21, which pinion is operated by a crank 22.

Slidably mounted in the guide 14 as indicated at 23, is a slide or carrier 24, to the opposite ends of which is secured the chain 19 as indicated at 25 and 26, so that operation of the crank 22 in opposite directions will move the slide 24 in opposite directions.

Figure 5:
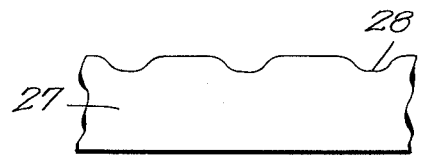
Fig. 5 is a fragmentary view of the cam used in grinding the knife edge shown in Fig. 4.
Figure 6:
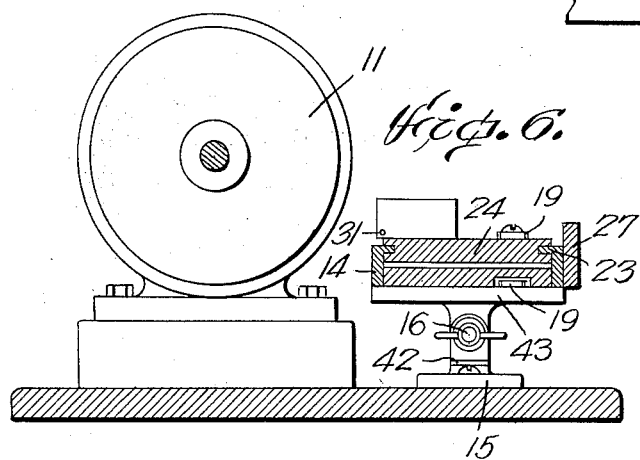
Fig. 6 is a section taken on line 6—6 of Fig. 2.
Figure 4:
Fig. 4 is a fragmentary view of the knife edge.

Fixedly secured on the guide 14, is a cam 27, which is provided with a series of recesses 28 to conform with the specific form of the knife edge to be ground, the form shown in Fig. 5 being adapted for grinding a knife edge as shown at 29 on the knife 30.

Pivotally secured to the carrier 24, as indicated at 31, is a knife holder consisting of a frame 32, having an integral front clamp member 33 against which the knife is to be placed with cutting edge up, and an adjustable clamp member 34, this clamp member being urged to clamp the knife against the clamp member 33, by means of cams 35 which are pivoted as indicated at 36, in the frame member 32.

Adjustable stop means 37 is secured to the frame member 32 as indicated at 38, this stop member being used to gauge the setting of the knife blade, so as to cause the proper arrangement of the knife for properly grinding the undulations, or to place undulations in synchronism with the grinding device.

Integral with the upper portion of the bracket 15, is an adjusting member consisting of a pair of opposed brackets 39, one of the brackets being provided with an adjusting screw 40 for urging the guide 14 against the action of the spring 41, the guide 14 being pivotally secured to the front bracket 42, and slidable on the top surface 43 of the bracket 15. By this means, the guide 14 may be adjusted toward or away from the grinding wheel 13, at the left hand end of the machine, as viewed in Fig. 1, the guide pivoting at the bracket 42, thereby providing means for angular cutting of the knife undulations and also providing for wear of the grinding wheel or cutting back of the knife edge.

It will be noted that by this means the guideway is adjusted and the movement of the slide will carry the knife into cooperative relation to the grinding wheel throughout its length, and furthermore, that the angularity of the guide may also be adjusted about the pivots 16, whereby the guide is provided with both tilting and lateral adjustment.

Secured in the frame 32 is a cam bar or cam lever 44, which rides over the surface 45 of the cam 27, and causes oscillation up the frame, together with the knife.

The operation of the device is as follows:—

The handle or crank 22 is rotated to move the slide 24 to one end of the guideway or carriage 14. A knife 30 is then placed between the clamp members 33 and 34, and against the stop 37, after which the cams 35 are moved to force the clamp 34 against the knife, securing the knife in fixed position, the stop member 37 having been previously set so that the highest point of the undulations 29 of the knife 30 are in registry with the grinding wheel 13 when the cam lever 44 is centered in the recesses 28 in the cam member 27.

The guideway 14 is next adjusted about the pivots 16, to provide the proper cutting edge angle on the knife, and the guide is then adjusted laterally by means of the screw 40, until the knife edge just contacts with the grinding wheel 13.

The motor 11 is then connected into an electric circuit to drive the grinding wheel 13.

The handle 22 is then rotated to move the slide 24 to one end of the guideway 14, this movement providing a slow movement of the slide through the pinion 21 and gear 20 and the chain 19. As the slide reaches one terminal of its travel, the screw 40 is given a slight turn to adjust the knife closer to the grinding wheel, the crank 22 is then rotated in the opposite direction, carrying the knife to the other terminal of travel, each reverse movement of the slide 24 being preceded by a slight adjustment of the screw 40, until the proper degree of grinding is accomplished.

It will be noted that by this arrangement, with the motor running, to grind a series of knives for a bread slicing machine, that after adjusting the guide for angularity relative to a horizontal plane, that it is merely necessary to insert the knife between the clamp members 33 and 34, throw the cam levers 35 over to clamp the knife and follow by rotation of the crank 22, and at each reversal in the travel of the slide 24, slightly adjust the guide by means of the screw 40 until one side of the knife is suitably ground, then merely reverse the knife in the holder and repeat the operation to finish the other side of the knife.

It will be understood that variations in construction and arrangement of parts, which are consistent with the appended claims, may be resorted to without detracting from the spirit or scope of the invention or sacrificing any of the advantages thereof.

I claim:—

1. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide.

2. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member.

3. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said integral adjusting member consisting of a spring cooperating with one side of the guide and urging the other side of the guide against an adjusting screw.

4. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said knife support consisting of a frame having an integral clamp member to cooperate with one side of a knife blade, and a movable clamp member and securing means therefor to cooperate with the other side of the blade, and an adjustable gauge for the end of the blade.

5. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said knife support consisting of a frame having an integral clamp member to cooperate with one side of the knife blade and a movable clamp member and securing means therefor, to cooperate with the other side of the blade, and an adjustable gauge for the end of the blade.

6. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said integral adjusting member consisting of a spring cooperating with one side of the guide and urging the other side of the guide against an adjusting screw, said knife support consisting of a frame having an integral clamp member to cooperate with one side of a knife blade, and a movable clamp member and securing means therefor, to cooperate with the other side of the blade, and an adjustable gauge for the end of the blade.

7. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said reversible means for moving the support consisting of a sprocket pivotally mounted at each end of the guide, a chain passing under the guide, over both sprockets and having the opposite ends affixed to the opposite ends of the support, and means for driving one of the sprockets.

8. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said reversible means for moving the support consisting of a sprocket pivotally mounted at each end of the guide, a chain passing under the guide, over both sprockets and having the opposite ends affixed to the opposite ends of the support, and means for driving one of the sprockets.

9. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said integral adjusting member consisting of a spring cooperating with one side of the guide and urging the other side of the guide against an adjusting screw, said reversible means for moving the support consisting of a sprocket pivotally mounted at each end of the guide, a chain passing under the guide, over both sprockets and having the opposite ends affixed to the opposite ends of the support, and means for driving one of the sprockets.

10. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said knife support consisting of a frame having an integral clamp member to cooperate with one side of a knife blade, and a movable clamp member and securing means therefor to cooperate with the other side of the blade, and an adjustable gauge for the end of the blade, said reversible means for moving the support consisting of a sprocket pivotally mounted at each end of the guide, a chain passing under the guide, over both sprockets and having the opposite ends affixed to the opposite ends of the support, and means for driving one of the sprockets.

11. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said knife support consisting of a frame having an integral clamp member to cooperate with one side of the knife blade and a movable clamp member and securing means therefor, to cooperate with the other side of the blade, and an adjustable gauge for the end of the blade, said reversible means for moving the support consisting of a sprocket pivotally mounted at each end of the guide, a chain passing under the guide, over both sprockets and having the opposite ends affixed to the opposite ends of the support, and means for driving one of the sprockets.

12. A knife grinding machine comprising a grinding wheel and driving means therefor, a guide pivotally mounted in a plane parallel to the axis of the grinding wheel and adjustable in angular relation thereto, a support slidable in said guide, a knife holder hingedly mounted on said support and having a cam lever integral therewith, an undulating cam fixed on said guide for cooperation with the cam lever, and reversible means for moving the support in the guide, said guide being mounted on two spaced pivoted brackets provided with releasable securing means against pivotal movement, and pivotally secured to one of the brackets and slidably secured to the other bracket, the other bracket having an integral adjusting member, said integral adjusting member consisting of a spring cooperating with one side of the guide and urging the other side of the guide against an adjusting screw, said knife support consisting of a frame having an integral clamp member to cooperate with one side of a knife blade, and a movable clamp member and securing means therefor, to cooperate with the other side of the blade, and an adjustable gauge for the end of the blade, said reversible means for moving the support consisting of a sprocket pivotally mounted at each end of the guide, a chain passing under the guide, over both sprockets and having the opposite ends affixed to the opposite ends of the support, and means for driving one of the sprockets.

ANGUS McMILLAN.